US006996062B1

(12) United States Patent
Freed et al.

(10) Patent No.: US 6,996,062 B1
(45) Date of Patent: Feb. 7, 2006

(54) POLICY-BASED WEIGHTED RANDOM EARLY DETECTION METHOD FOR AVOIDING CONGESTION IN INTERNET TRAFFIC

(75) Inventors: Michael Freed, Pleasanton, CA (US); Satish Kumar Amara, Mt. Prospect, IL (US)

(73) Assignee: 3COM Corporation, Marlborough, MA (US)

( * ) Notice: Subject to any disclaimer, the term of this patent is extended or adjusted under 35 U.S.C. 154(b) by 856 days.

(21) Appl. No.: 09/795,549

(22) Filed: Feb. 28, 2001

(51) Int. Cl.
*H04J 1/16* (2006.01)
(52) U.S. Cl. ..................................... 370/235; 370/252
(58) Field of Classification Search ............... 370/230, 370/235, 252, 412, 465
See application file for complete search history.

(56) References Cited

U.S. PATENT DOCUMENTS

| | | | |
|---|---|---|---|
| 5,394,402 A | 2/1995 | Ross | |
| 5,499,238 A | 3/1996 | Shon | |
| 5,742,772 A | 4/1998 | Sreenan | |
| 5,850,399 A | 12/1998 | Ganmukhi et al. | |
| 6,167,445 A * | 12/2000 | Gai et al. ................... | 709/223 |
| 6,252,848 B1 * | 6/2001 | Skirmont .................... | 370/229 |
| 6,463,068 B1 * | 10/2002 | Lin et al. .................... | 370/414 |
| 6,556,578 B1 * | 4/2003 | Silberschatz et al. ....... | 370/412 |
| 6,560,198 B1 * | 5/2003 | Ott et al. .................... | 370/235 |
| 6,643,260 B1 * | 11/2003 | Kloth et al. ................. | 370/235 |
| 6,675,220 B1 * | 1/2004 | Bergamasco et al. ....... | 709/232 |
| 6,690,645 B1 * | 2/2004 | Aweya et al. ............... | 370/230 |
| 6,721,796 B1 * | 4/2004 | Wong ........................ | 709/232 |
| 6,744,767 B1 * | 6/2004 | Chiu et al. ............. | 370/395.21 |

FOREIGN PATENT DOCUMENTS

WO     WO 99/110003     3/1999

OTHER PUBLICATIONS

Lowery, Carliyn M., "Protocols for Providing Performance Guarantees in a Packet-Switching Internet", Computer Science Division, Department of Electrical Engineering and Computer Science, University of California, Berkeley (1991) pp. 1-19.
Fishburn, Peter C. et al. "Dynamic Behavior of Differential Pricing and Quality of Service Options for the Internet", AT&T Labs-Research, 180 Park Avenue, Florham Park, NJ 07932, Nov. 16, 1998. pp. 1-32.
Lin, Dong et al., "Dynamics of Random Early Detection", Division of Engineering and Applied Science, Harvard University, Cambridge, MA 02138 USA.
"Policy Based Quality of Service for enterprise LANs", Extreme Networks, Inc., Executive Summary (1999).
"Congestion Avoidance Overview", www.cisco.com/univercd/cc/td/doc/product/software/ios120/12cgcr/qos_c/qcpart3/qcconavad.htm5/15/01 pp. 1-8.
"Random Early Detection", ftp://ftp-eng.cisco.com/fred/rsvp-eft/fred-cfg-interface-drop-html.
Weighted Random Early Detection on the Cisco 12000 Series Router http://www.cisco.com/univercd/cc/td/doc/product/software/ios112/ios112p/gsr/wred_gs.htm5/15/01 pp. 1-28.
Floyd, Sally et al., "Random Early Detection Gateways for Congestion Avoidance", IEEE/ACM Transaction on Networking, Aug. 1993, pp.1-32.

* cited by examiner

*Primary Examiner*—Andy Lee
(74) *Attorney, Agent, or Firm*—McDonnell Boehnen Hulbert & Berghoff LLP

(57) ABSTRACT

A method and apparatus for avoiding network congestion. An exemplary packet forwarding device may apply policy rules to incoming packets to assign relative drop probabilities to the packets based on the priority of the packets. In times of network congestion, packets may be selectively dropped according to their associated drop probability.

24 Claims, 5 Drawing Sheets

| Rule | Src IP/mask | Dst IP/mask | Src Port | Dst Port | Action |
|---|---|---|---|---|---|
| 1 | 149.112.240.0/24 | 128.153.4.128/25 | * | 25 | Low priority |
| 2 | 149.112.240.0/24 | 128.153.4.128/25 | * | 1-1023 | High priority |
| 3 | 169.254/16 | 10.12.0.0/16 | * | * | High priority |
| 4 | 169.254/16 | 10.0.0.0/8 | * | * | Translate |
| 5 | 149.112.0.0/16 | * | * | * | Low Priority |
| 6 | * | * | * | * | Drop |

POLICY-BASED WEIGHTED RANDOM EARLY DETECTION METHOD FOR AVOIDING CONGESTION IN INTERNET TRAFFIC

BACKGROUND OF THE INVENTION

1. Field of the Invention

A method that relates generally to telecommunications and, more particularly, to router algorithms and architectures for applying policy-based routing decisions to packets in a packet-based network, is disclosed.

2. Description of Related Art

As high-speed computer networks have become more widely available with increased bandwidth carrying capability, it has become possible to use computer networks for more diverse applications such as audio and video. Originally, the Internet was designed to carry digital data such as text and computer data files. With such digital files, Internet data transfers were satisfactory as long as the full file reached its destination in a reasonable time. Today, however, many new applications are placing real-time demands on the Internet. For example, when voice, music, video and still images are transferred, the timing of data arrival becomes crucial, or at least much more important, to the network's ability in carrying the information.

In times of network congestion, network routers' queues become full until they can no longer accommodate more traffic. Typically, routers have handled this situation by implementing a technique known as tail drop. Using tail drop, a router simply drops packets indiscriminately (that is, without regard to priority or class of service, etc.) until the output queue is no longer full. Dropping packets is the current feedback mechanism for TCP. When packets are dropped from a TCP connection, for example, from a source that is sending data faster than it can be handled by a router, the source may use a "slow start" technique to reduce its data transfer rate until congestion is reduced.

If a router uses tail drop as its congestion avoidance mechanism, the source will typically go into slow start mode whenever a burst of traffic causes the router's receive queue to fill. Then, the router will receive very little traffic from the source as the source tries to recover lost packets, after which the source may ramp up its data rate until the router begins to file again and the process is repeated. This mechanism causes data from a high-speed source to be sent in bursts with periods of low transmission rates between bursts. Congestion avoidance techniques that can handle bursts of traffic without dropping many (or all) packets during periods of congestion allow routers to maintain higher overall data transfer rates than those that use tail drop.

Lost information in the form of dropped packets can be unacceptable to businesses providing customers with Voice over IP ("VoIP") or video over IP, who are often in competition with legacy suppliers of these services, such as local exchange carriers and cable television providers. The importance of satisfying the needs of bandwidth-hungry applications that are crucial to the business of providers has given rise to QoS (Quality of Service) mechanisms or controls. QoS simply means that there is some quantifiable measure of the service being provided. Several factors, for example, packet loss rate, a maximum delay rate, a guaranteed minimum bandwidth, or a maximum allowed bandwidth, etc., may be used to measure a network's QoS. Routers that use tail drop to handle congestion drop packets indiscriminately when network traffic is heavy, however, are not generally capable of providing differentiated QoS to network users.

Random Early Detection ("RED"), Flow Random Early Drop ("FRED"), and Weighted Random Early Detection ("WRED") are among the methods that have been used to avoid congestion more effectively than tail dropping. All these methods are improvements over the technique of simply dropping packets when a gateway's queue is too full for its buffer to handle any further increase in packet flow. By implementing some variation of randomly dropping or marking packets before a gateway's buffers are overloaded, the methods can exercise some control over data flows to prevent congestion.

The RED technique controls congestion by dropping or marking packets with a drop probability (hence the term random) whenever the average queue size exceeds a predetermined minimum threshold. Because some packets are dropped before the queue is completely full, and because more packets are dropped as the average queue approaches a maximum threshold (i.e., the maximum queue size), RED and its variants can reduce the burst/low rate cycling problem associated with tail drop. RED gateways or routers keep the average queue size low while allowing occasional bursts of packets in the queue. During congestion, the probability that the router will notify a particular connection to reduce its data transfer rate (e.g., by marking or dropping packets) is roughly proportional to that connection's share of the bandwidth through the gateway. The RED router has no bias against bursty traffic and thus avoids "global synchronization" that is, many connections decreasing their congestion windows at the same time. RED is easy to implement and it won't unduly burden the gateway's processing resources.

RED, however, is not an optimal QoS control from the viewpoint of an end user of real-time sensitive, high-bandwidth data transmission; RED is best used where sources are able to reduce their throughput in response to dropped or marked packets, since packets will be dropped regardless of a source's response to a router's actions and also without regard to any priority differential of a connection, if traffic gets too heavy. Thus, a better solution is desired.

FRED improves on the performance of RED from the viewpoint of low flow-rate sources. FRED is more likely to drop or mark packets from sources with a higher number of packets queued. Further, FRED is not scalable for a large number of flows.

WRED, a variation of RED, is somewhat better at implementing QoS-sensitive congestion avoidance, since it selectively drops or marks packets based on either IP precedence or the resource reservation protocol (RSVP). Because the number of traffic flow types that can be classified by WRED is limited, however, a still better method of congestion avoidance is desired. In Internet Architecture, WRED is more suitable for core routers. A different kind of QOS algorithm that gives more control of traffic management for network administrators, is required for edge routers.

SUMMARY OF THE INVENTION

A method and apparatus for avoiding network congestion in a packet forwarding device is described. According to an exemplary embodiment, a method is provided for selectively dropping packets from a router's queue when the average queue size increases based on routing policy rules set by a network manager. A packet forwarding device receives at least one flow of packets of a particular type. The packet forwarding device additionally receives policy information to be applied to the flow of packets, as well as at least one queue parameter, such as a minimum queue threshold value. The packet forwarding device may then assign a drop probability to the flow of packets based upon the policy information. For example, the packet forwarding device may continuously calculate an average queue size and drop packets from a flow based at least in part on the drop probability of the packets, the average queue size, and one or more queue parameters. In this way, traffic flows may be clustered according to a wide range of parameters or categories, where the probability of dropping packets from a high priority flow during times of congestion is less than that of dropping packets from a lower priority flow.

The described embodiments allow networks to better control and handle network congestion. Using policy rules, routers can control packets that are dropped according to a determined priority. Using such priorities, different QOS can be defined and implemented.

Other features of the present invention will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which:

FIG. 4 illustrates a policy table for use in a router; and

DETAILED DESCRIPTION OF AN
EXEMPLARY EMBODIMENT

Figure 1:
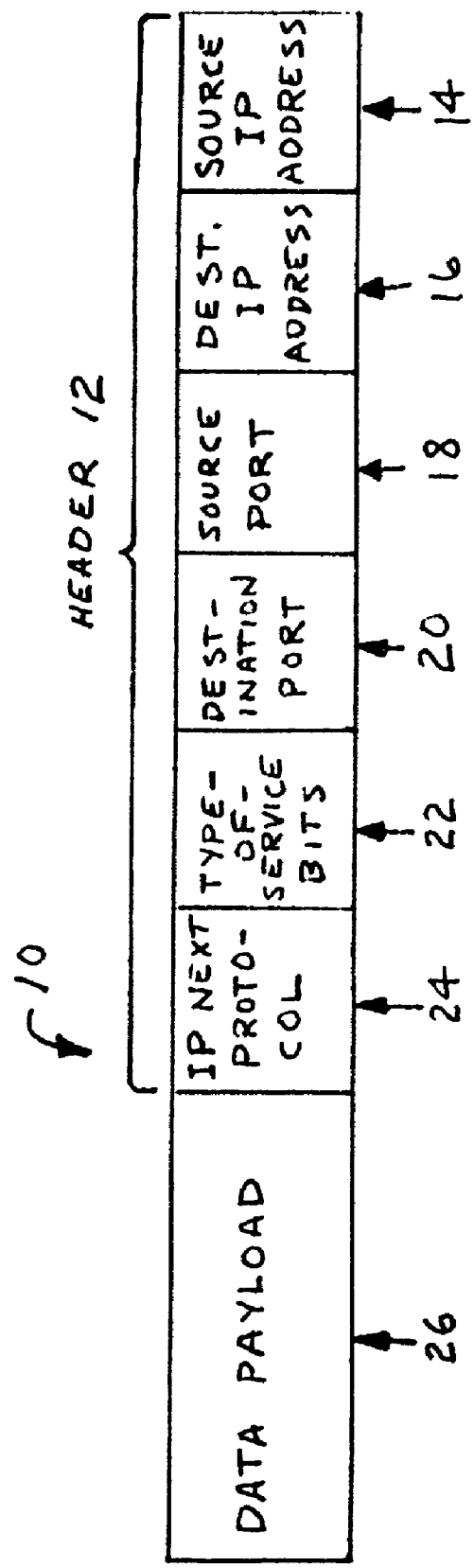
FIG. 1 is a diagram illustrating a typical IP packet.

Referring to the drawings, FIG. 1 illustrates a typical IP packet 10. Packet 10 may comprise a header 12 and a data payload 26. More specifically, header 12 may be comprised of source IP address 14, destination IP address 16, source port 18, destination port 20, type of service bits 22, and IP next-protocol field 24.

Figure 2:
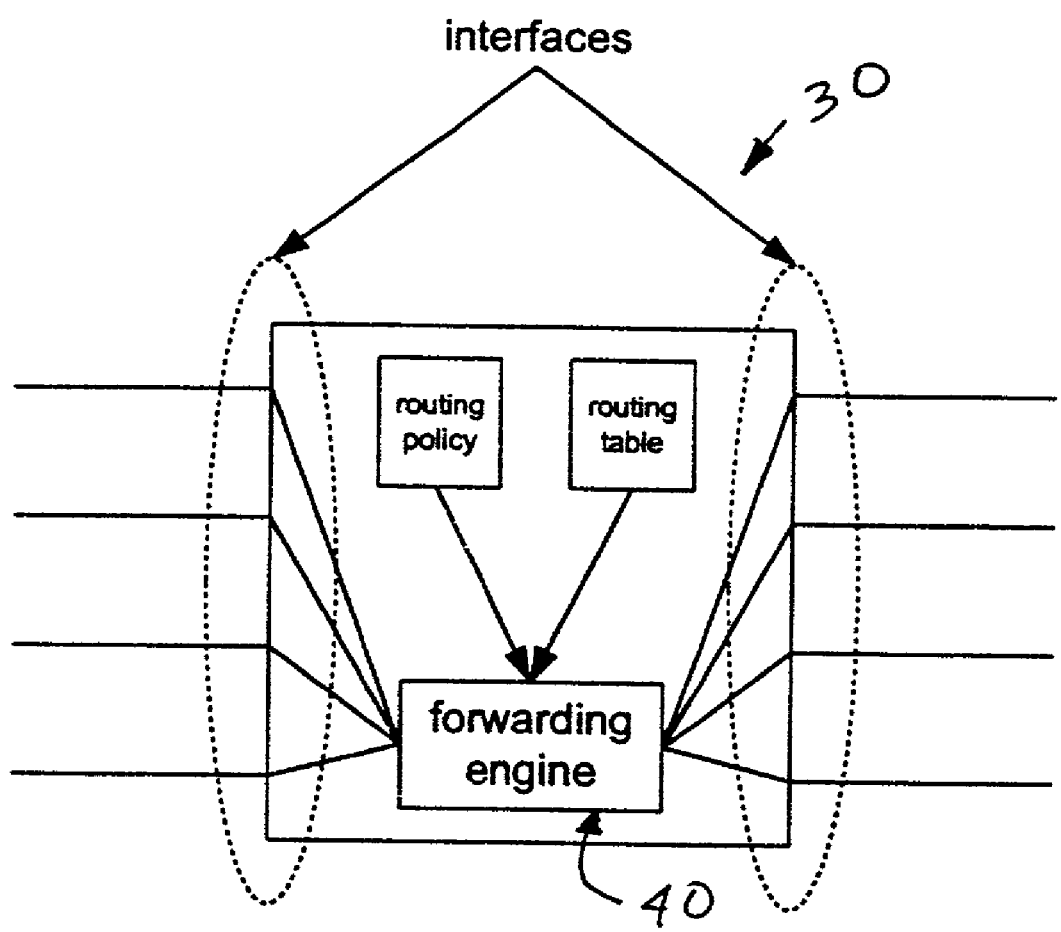
FIG. 2 generally illustrates a packet router.

FIG. 2 illustrates router 30 that contains policy-based logic as well as a conventional routing table, both of which interact with router 30's forwarding engine 40 to determine how packets are routed. As seen in FIG. 2, router 30 has two interfaces for receiving and transmitting packets. The receiving and forwarding of packets is handled by forwarding engine 40 according to the routing table and routing policy of the particular router 30 as is described below in more detail.

Figure 3:
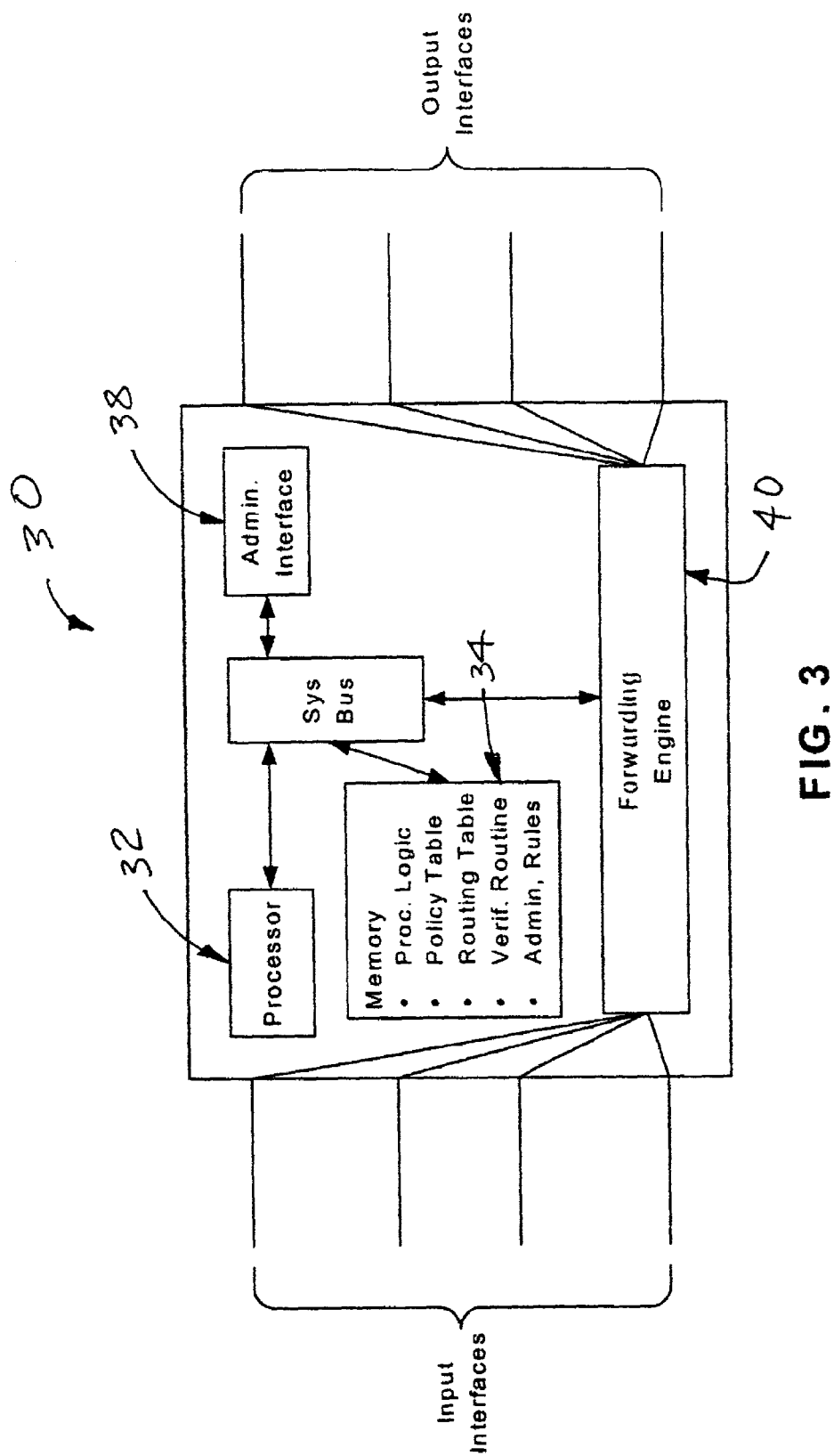
FIG. 3 illustrates the packet router of FIG. 2 in greater detail.

In FIG. 3, exemplary router 30 is shown in more detail. For purposes of illustration and clarity of explanation, this description will focus on the operation of congestion avoidance in router 30. Router 30 may, by way of example, include a processor 32 (e.g., an integrated circuit microprocessor), a memory 34 (e.g., ROM, flash memory, non-volatile memory, hard disk, etc.), an administrative interface 38, and a forwarding engine 40, all of which may be interconnected by a system bus. This particular configuration is not particularly important to the functioning of the present invention. For example, the present invention could be implemented by a device without a system bus and having a memory and processor contained in a single integrated circuit. Also, one or even all of the functions of the processor and memory may take be implemented outside the router. Further, those skilled in the art will appreciate that many of the elements described in this exemplary embodiment are functional entities that may be implemented as discrete components or in conjunction with other components, in any suitable combination and location.

Memory 34 may include more than one physical element, and may also include an operating system for processor 32, a policy table, a routing table, and one or more queue parameters. The tables may be stored in memory and executed by the processor or may be implemented in logic such as programmable logic arrays, custom gate arrays, etc. Memory 34 may also include a set of stored logic that enables router 30 to dynamically calculate the average queue size, assign priorities to incoming packets based on policy that defines various types of traffic flows (e.g., voice traffic), and to drop packets based at least in part upon their priority and the average queue size. Provided with the present disclosure, those of ordinary skill in the art can readily prepare appropriate computer instructions to perform such functions.

Router 30 applies routing decisions to incoming packets based on policy rules contained in policy tables such as policy table 42 shown in FIG. 4. Parameters stored in a policy table are typically expressed as (or can be converted to) ranges rather than discrete values. Applying parameters to ranges can be more efficient, resulting in fewer table entries rather than specific entries for each IP address. For example, an IP address with a mask indicates a range of IP addresses, which is a contiguous set of IP addresses represented by a 32-bit number in dotted-decimal form together with a prefix (mask) length. To illustrate, the source IP address range 149.112.240.0/24, which is a parameter of rule 1 in policy table 42, represents source IP addresses 149.112.240.0 through 149.112.240.255, with the 24 highest order bits in the address "masked" by the number 255.255.255.0, leaving the 8 lowest order bits in the address to represent the range of source addresses. An asterisk (*) in policy table 42, such as destination IP of rule 5, represents a "wildcard" character, representing the entire range of the parameter (e.g., 0 through 4,294,967,295 for IP addresses).

A router may make policy-based routing decisions based on information contained in packet headers, the payloads of packets, or other considerations. Examples of policy decisions that may be implemented include making routing decisions, priority queuing, quality of service (QoS) marking, port and address translation, or dropping packets altogether. Thus, policy-based routing involves more actions, based on more dimensions, than conventional routing algorithms, which simply decide whether to forward a packet, drop it, or queue it prior to making a routing decision based on the source, destination, and some efficiency metric regarding the best path for the packet.

Figure 5:
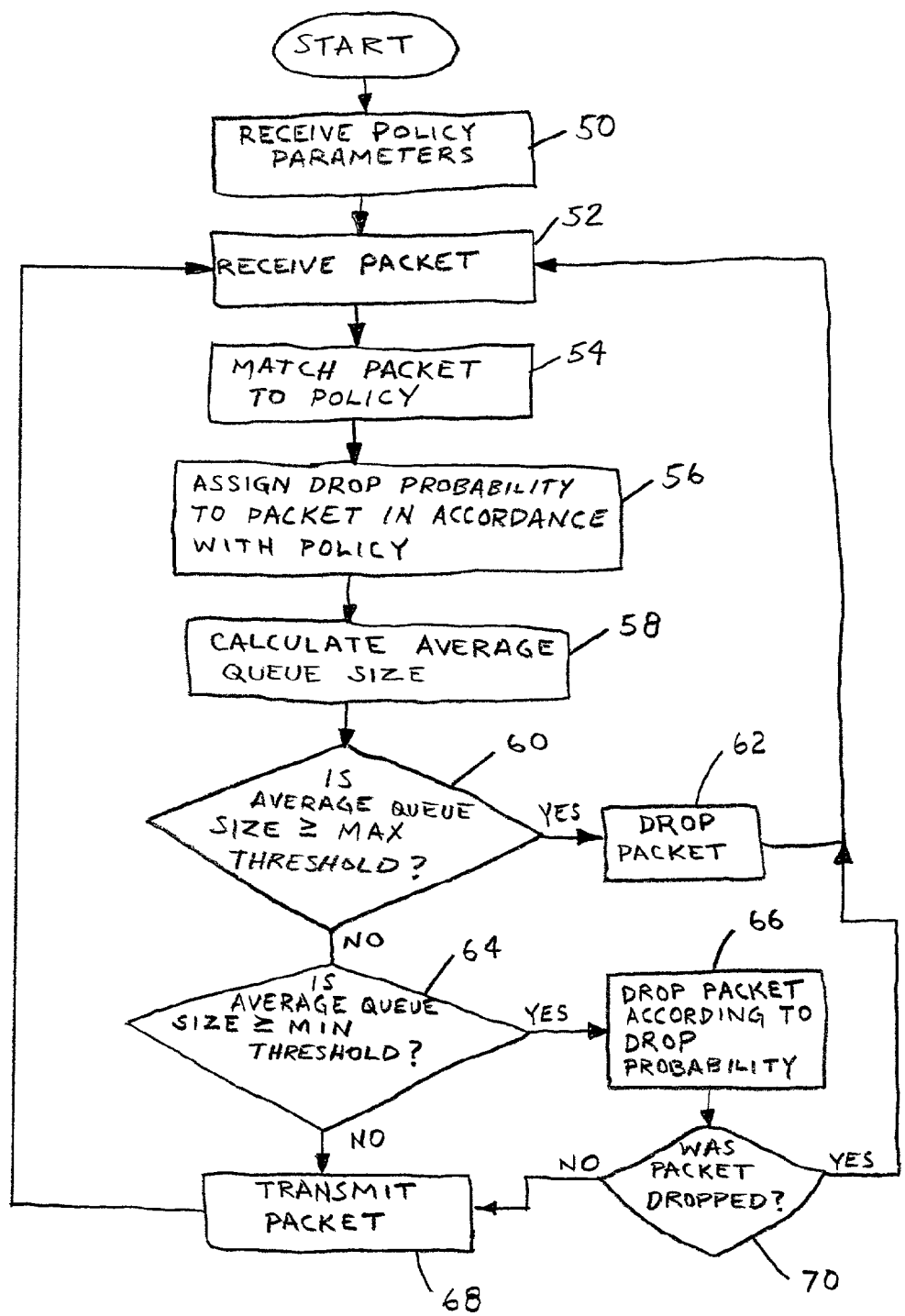
FIG. 5 is a flow chart that illustrates the operation of an exemplary embodiment of the present invention.

Rules in a policy table are typically generated offline, based at least in part on parameters entered by a network manager, as shown at step 50 in FIG. 5. For example, a network manager may enter minimum and maximum threshold queue values via administrative interface 38 so that router 30 may selectively drop packets when the average queue size is between the minimum threshold and the maximum threshold. A network manager may also assign, at step 50, a weighting factor to each queue to filter the average queue size, as described in more detail below. Additionally, a manager may assign the desired QoS flow weights to each type or category of traffic flow based on policy rules. For example, using source or destination information, data type information, or any other criteria in a policy table, router 30 may be configured to identify a particular flow as a high priority flow, a low priority flow, or a flow with an intermediate priority. Thus, a network manager may easily cluster flows of traffic according to priority, such as voice, data, and internet traffic. Alternatively, some or all of these parameters may be pre-stored in memory 34 based on the operating capabilities and requirements of router 30.

Thus, during on-line operation, when router 30 receives a new packet as shown in step 52, the packet is checked to see which policy rule it matches, shown at step 54. For example, a packet with a source IP address of 149.112.240.168, a destination IP address of 128.153.4.200, any source port, and a destination port of 25 would match rule 1 in table 42 of FIG. 3, so the packet will be assigned a low priority and, correspondingly, a low QoS flow weight. If a packet doesn't match any rule in the table, the last rule (such as rule 6 in table 42) will be applied to the packet by default after the packet has been compared to all the other rules in the table, since packets are compared to the rules of a policy table from the top down.

Because router 30 is capable of making routing decisions based on a virtually unlimited number of policy rules, it gives a network manager great flexibility in assigning QoS flow weights to different flows based on policy, especially compared to assigning QoS levels to packets based only on IP precedence, which provides eight discrete levels of priority as determined by the status of three precedence bits in the 8-bit type-of-service (TOS) field of a typical IP datagram.

Input traffic flows are received at router 30's input interface, as shown at step 52. As described above, a manager or administrator may configure router 30 to assign a QoS flow weight to each traffic flow—i.e., all packets that are associated with each other. Router 30 may then calculate and assign a drop probability to the incoming packets of a flow, per step 56. The drop probability assigned to a flow may be based at least in part on the flow weight, the weighted average queue size as calculated by processor 32 at step 58, and the number of packets that have been transmitted since the last drop from the flow, as shown at step 56.

The weighted average queue size may be calculated, per step 58, according to the following formula or any similar formula:

$$\text{weighted\_avg} = (\text{previous\_avg} * (1-w)) + (\text{current\_queue\_size} * w).$$

Where w ranges from 0 to 1. A large weighting factor, w, decreases the effect of the previous average on the weighted average, while a small weighting factor increases the effect of the previous average. Increasing the effect of the previous average queue size has a more pronounced filtering effect on the weighted average, preventing the weighted average from changing rapidly in response to temporary increases in traffic flows (i.e., "bursty" traffic). This, in turn, makes router 30 less likely to drop packets when traffic is bursty, as long as the average queue size is adequately controlled.

The drop probability of any particular packet may be calculated by the following formulas or any similar formulas that calculate a drop probability based on the priority of a traffic flow:

$$p(i) = p(\max) * (1-\text{flow\_weight}) * (\text{weighted\_avg} - \text{Min}) / (\text{Max} - \text{Min}). \quad p(\text{final}) = p(i)/(1-\text{count}*p(i)).$$

where p(i) is an intermediate drop probability used to calculate the final drop probability, p(final), Max and Min are the threshold queue parameters entered by a network manager or pre-stored in router 30, and count represents the number of packets transmitted since the last dropped packet. The flow_weight, which ranges from 0 to 1, represents the relative priority of the traffic flow, with 1 being the highest priority. Also, p(max) represents the maximum possible probability that any packet will be dropped. As with the other parameters, flow_weight and p(max) may be entered by a network manager or pre-stored in router 30. Using these formulas, p(i) will increase linearly from zero to p(max)*(1-flow_weight) as the weighted average increases from Min to Max. The flow weight, as used in the formula, may range from 0 to 1. Note that, according to an exemplary embodiment of the present invention, all packets will be dropped if weighted_avg>Max, per step 62, while no packets are dropped from an output queue unless weighted_avg>Min, per step 64 and step 68.

If a packet is dropped according to its drop probability, as shown in step 66 and 70, router 30 will continue the process with additional incoming packets, starting at step 52. If a packet is not dropped as determined at step 70, it will be added to an output queue and transmitted, per step 68.

Thus, a flow with an assigned flow weight of 0.9, for example (i.e., a high-priority flow such as voice traffic) will have a p(i) of just 0.1 of p(max), whereas a lower priority flow that may be assigned to ftp traffic, for example, such as 0.2, would have an intermediate drop probability of 0.8 of p(max). From this example, it can be seen that there is a much lower probability that packets from a high priority flow will be dropped compared to packets from a low priority flow.

The final drop probability, p(final), takes into account the number of packets that have been transmitted since the last packet was dropped from a given flow, represented by the variable count. Thus, it is somewhat unlikely that two or more packets in a row will be dropped from a flow. Count will be limited in size not only by the final drop probability, but also because router 30 may programmed to drop packets whenever weighted_avg exceeds Max. Thus, router 30 effectively controls the average queue size of traffic flows based on parameters assigned by a network manager, the operating capabilities of router 30, and the priorities of traffic flows through the router.

Even for traffic flows of low priority, such as internet traffic, the average throughput of router 30 may be an improvement over a router that uses tail drop, since packets from a relatively low priority flow will be dropped randomly before the queue is completely full, and the average queue size and the number of packets transmitted since the last drop will be taken into account (i.e., it is less likely that two or more packets in a row will be dropped), so burst/low rate cycling effects due to large numbers of packets being dropped at once can be avoided.

Exemplary embodiments of the present invention have been illustrated and described. It will be understood, however, that changes and modifications may be made to the invention without deviating from the spirit and scope of the invention, as defined by the following claims.

What is claimed is:

1. A method for avoiding network congestion in a packet forwarding device, the method comprising the steps of:
   receiving at the packet forwarding device at least one flow of packets;
   receiving at the packet forwarding device policy information to be applied to the at least one flow of packets, wherein the policy information includes at least one rule associated with address information and a traffic category;
   receiving at the packet forwarding device at least one queue parameter;

continuously calculating, in the packet forwarding device, an average queue size;

assigning a drop probability to the at least one flow of packets based upon (i) the policy information, and (ii) a number of packets transmitted since a packet was last dropped;

selectively dropping packets from the at least one flow of packets based at least in part upon the drop probability, the average queue size, and the at least one queue parameter.

2. The method of claim 1, wherein the address information comprises at least one source address.

3. The method of claim 1, wherein the address information comprises at least one destination address.

4. The method of claim 1, wherein the policy information comprises at least one rule associated with a source or destination port associated with a communication protocol.

5. The method of claim 1, wherein the at least one flow of packets comprises a voice traffic flow, and wherein the traffic category is voice traffic.

6. The method of claim 1, wherein the at least one queue parameter includes a minimum threshold.

7. The method of claim 1, wherein the at least one queue parameter includes a maximum threshold.

8. The method of claim 1, wherein the at least one queue parameter comprises a minimum threshold and a maximum threshold.

9. The method of claim 8, wherein packets are selectively dropped from the at least one flow of packets whenever the average queue size is between the minimum threshold and the maximum threshold.

10. The method of claim 1, wherein the traffic category comprises a category selected from the group consisting of voice, data, and internet traffic.

11. A method for avoiding network congestion in a packet forwarding device, the method comprising the steps of:

receiving at the packet forwarding device at least one flow of packets comprising a voice traffic flow;

receiving at the packet forwarding device at least one policy rule to be applied to voice traffic, wherein the at least one policy rule is associated with address information and traffic category information;

receiving at the packet forwarding device queue parameters comprising a minimum threshold and a maximum threshold;

continuously calculating, in the packet forwarding device, an average queue size;

assigning a drop probability to the voice traffic flow based upon (i) the at least one policy rule, and (ii) a number of packets transmitted since a packet was last dropped; and selectively dropping packets from the voice traffic flow based upon the drop probability whenever the average queue size is between the minimum threshold and the maximum threshold.

12. The method of claim 11, wherein the traffic category information comprises information selected from the group consisting of voice traffic information, data traffic information, and internet traffic information.

13. A method for avoiding network congestion in a packet forwarding device, the method comprising the steps of:

receiving at the packet forwarding device at least one flow of packets;

receiving policy information to be applied to the at least one flow of packets, wherein the policy information includes at least one rule associated with address information and traffic category information;

receiving at least one queue parameter;

continuously calculating an average queue size;

assigning a drop probability to the at least one flow of packets based upon (i) the policy information, and (ii) a number of packets transmitted since a packet was last dropped;

selectively dropping packets from the at least one flow of packets based at least in part upon the drop probability, the average queue size, and the at least one queue parameter.

14. The method of claim 13, wherein the address information comprises at least one source address.

15. The method of claim 13, wherein the address information comprises at least one destination address.

16. The method of claim 13, wherein the policy information comprises at least one rule associated with a source or destination port associated with a communication protocol.

17. The method of claim 13, wherein the at least one flow of packets comprises a voice traffic flow, and wherein the traffic category information indicates voice traffic.

18. The method of claim 13, wherein the at least one queue parameter includes a minimum threshold.

19. The method of claim 13, wherein the at least one queue parameter includes a maximum threshold.

20. The method of claim 13, wherein the at least one queue parameter comprises a minimum threshold and a maximum threshold.

21. The method of claim 20, wherein packets are selectively dropped from the at least one flow of packets whenever the average queue size is between the minimum threshold and the maximum threshold.

22. A method for avoiding network congestion in a packet forwarding device, the method comprising the steps of:

receiving at the packet forwarding device at least one flow of packets comprising a voice traffic flow;

receiving at least one policy rule to be applied to voice traffic, wherein the at least one policy rule is associated with address information and traffic category information;

receiving queue parameters comprising a minimum threshold and a maximum threshold;

continuously calculating an average queue size;

assigning a drop probability to the voice traffic flow based upon (i) the at least one policy rule, and (ii) a number of packets transmitted since a packet was last dropped; and selectively dropping packets from the voice traffic flow based upon the drop probability whenever the average queue size is between the minimum threshold and the maximum threshold.

23. A packet forwarding device for avoiding network congestion, comprising:

an input component that receives policy information, wherein the policy information includes at least one rule associated with address information and traffic category information;

at least one input port configured to receive incoming packets;

at least one output port configured to transmit packets, the at least one output port having at least one queue;

a prioritizing component that assigns a drop probability to each incoming packet based upon (i) the policy information and (ii) a number of packets transmitted since a packet was last dropped;

a forwarding engine coupled to the at least one input port and the at least one output port, the forwarding engine configured to queue or drop incoming packets based at least in part on the drop probability of the packets.

24. A computer usable medium having computer readable program code means embodied therein for causing a packet forwarding device to avoid network congestion, the computer readable program code means in the computer usable medium comprising sequences of instructions which, when executed by a processor, cause the processor to perform the steps of:

receiving at the packet forwarding device policy information to be applied to at least one flow of packets, wherein the policy information includes at least one rule associated with address information and traffic category information;

receiving at least one queue parameter;

continuously calculating an average queue size;

assigning a drop probability to the at least one flow of packets based upon (i) the policy information, and (ii) a number of packets transmitted since a packet was last dropped;

selectively dropping packets from the at least one flow of packets based at least in part upon the drop probability, the average queue size, and the at least one queue parameter.

\* \* \* \* \*